(12) United States Patent
Higgs et al.

(10) Patent No.: US 8,869,118 B2
(45) Date of Patent: Oct. 21, 2014

(54) SYSTEM AWARE PERFORMANCE COUNTERS

(75) Inventors: Raymond M. Higgs, Poughkeepsie, NY (US); George P. Kuch, Poughkeepsie, NY (US); Bruce H. Ratcliff, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 13/150,600

(22) Filed: Jun. 1, 2011

(65) Prior Publication Data

US 2012/0311544 A1 Dec. 6, 2012

(51) Int. Cl.
G06F 9/44 (2006.01)
G06F 11/34 (2006.01)

(52) U.S. Cl.
CPC ........ *G06F 11/3466* (2013.01); *G06F 2201/88* (2013.01); *G06F 11/3419* (2013.01); *G06F 2201/865* (2013.01)
USPC ............................ 717/130; 717/127; 717/131

(58) Field of Classification Search
None
See application file for complete search history.

(56) References Cited

U.S. PATENT DOCUMENTS

| | | | |
|---|---|---|---|
| 6,134,710 A | 10/2000 | Levine et al. | |
| 7,536,680 B2 | 5/2009 | Berry et al. | |
| 7,596,720 B2 | 9/2009 | Curtis et al. | |
| 7,761,556 B2 | 7/2010 | Mills | |
| 2002/0198976 A1 | 12/2002 | Davenport | |
| 2005/0138111 A1 | 6/2005 | Aton et al. | |
| 2005/0155026 A1* | 7/2005 | DeWitt et al. | 717/158 |
| 2005/0183065 A1* | 8/2005 | Wolczko et al. | 717/124 |
| 2005/0188269 A1 | 8/2005 | El-Shimi et al. | |
| 2006/0136582 A1 | 6/2006 | Mills | |
| 2007/0079293 A1* | 4/2007 | Wang et al. | 717/128 |
| 2007/0079298 A1* | 4/2007 | Tian et al. | 717/140 |
| 2007/0294681 A1* | 12/2007 | Tuck et al. | 717/149 |
| 2008/0189687 A1* | 8/2008 | Levine et al. | 717/128 |
| 2008/0313618 A1* | 12/2008 | Broman et al. | 717/130 |
| 2009/0089670 A1 | 4/2009 | Gooding et al. | |
| 2009/0320001 A1 | 12/2009 | Bates et al. | |
| 2010/0037101 A1 | 2/2010 | Zakonov et al. | |
| 2010/0057400 A1* | 3/2010 | Chou et al. | 702/182 |
| 2010/0275185 A1* | 10/2010 | Burton et al. | 717/130 |
| 2010/0299655 A1* | 11/2010 | Heisch et al. | 717/130 |
| 2011/0055838 A1* | 3/2011 | Moyes | 718/102 |
| 2012/0023487 A1* | 1/2012 | Letca et al. | 717/130 |
| 2012/0089984 A1* | 4/2012 | Adar et al. | 718/103 |
| 2012/0123739 A1* | 5/2012 | Sethumadhavan et al. | 702/186 |
| 2012/0216197 A1* | 8/2012 | Nair | 718/1 |

* cited by examiner

*Primary Examiner* — Insun Kang
(74) *Attorney, Agent, or Firm* — Cantor Colburn LLP; Steven Chiu (57) ABSTRACT

System aware performance counters including a processor for performing a method that includes executing a predefined code segment of an application, the executing on a processor. The executing includes executing an instrumented thread included in the predefined code segment. The method includes performing a first action associated with executing the instrumented thread in the predefined code segment, and registering the instrumented thread. A performance counter associated with the predefined code segment is started. Also, the execution of the predefined code segment is paused and the performance counter is paused. The method further includes performing a second action associated with pausing the executing of the predefined code segment. The executing of the predefined code segment is resumed and the performance counter is resumed responsive to resuming the executing of the predefined code segment. Also, a third action associated with resuming executing the predefined code segment is performed.

21 Claims, 6 Drawing Sheets

SYSTEM AWARE PERFORMANCE COUNTERS

BACKGROUND

The present invention relates generally to data processing, and more specifically to the analysis and management of hardware resources in a computer system through a performance counter library.

Performance counters provide statistical information about application behavior. The information contained in the performance counters may be used by operations such as, but not limited to: (i) debugging and troubleshooting performance and resource usage problems; (ii) tuning application configuration to achieve optimum performance; (iii) providing capacity management to properly scale applications according to business needs; and (iv) providing application health monitoring and service level monitoring. Typical issues that are addressed by performance counters are slow performance and high consumption of shared resources such as a central processing unit (CPU), a network, a memory, and file systems. In addition, performance counters may also be used for warning about high usage of internal application resources. For example, for an application that uses an internal queue for storing requests, the application may provide a performance counter that shows percent of queue used. When usage goes above a predefined threshold, a warning may be issued. In this manner, performance counter data helps to determine system bottlenecks and fine-tune system and application performance by providing users with an analytical data of how well the system is performing.

SUMMARY

An embodiment is a method that includes executing a predefined code segment of an application, the executing on a processor. The executing includes executing an instrumented thread included in the predefined code segment. The performance counter associated with the predefined code segment is started responsive to executing the instrumented thread. At least a first action associated with executing the instrumented thread in the predefined code segment is performed. The execution of the predefined code segment is paused and the performance counter is paused, in response to pausing the execution of the predefined code segment. At least a second action associated with pausing executing the executing of the predefined code segment is performed. The execution of the predefined code segment is resumed and the performance counter resumes in response to resuming the execution of the predefined code segment. At least a third action associated with resuming executing the predefined code segment, the performing the at least third action responsive to enabling the performance counter and registering the instrumented thread.

Another embodiment is a system having a processor configured to perform a method that includes executing a predefined code segment of an application, the executing including executing an instrumented thread included in the predefined code segment. The method includes starting a performance counter associated with the predefined code segment, the starting responsive to executing the instrumented thread. At least a first action associated with executing the instrumented thread in the predefined code segment is performed. The execution of the predefined code segment is paused. In addition, the method includes pausing the performance counter responsive to pausing the executing of the predefined code segment and at least a second action associated with pausing executing the executing of the predefined code segment is performed. Further, resuming the executing of the predefined code segment, and resuming the performance counter responsive to resuming the executing of the predefined code segment and at least a third action associated with resuming executing the predefined code segment.

A further embodiment is a computer program product including a tangible storage medium readable by a processing circuit and storing instructions for execution by the processing circuit for performing a method including executing a predefined code segment of an application, the executing including executing an instrumented thread included in the predefined code segment. The method includes starting a performance counter associated with the predefined code segment, the starting responsive to executing the instrumented thread. At least a first action associated with executing the instrumented thread in the predefined code segment is performed. The method further includes pausing the executing of the predefined code segment, pausing the performance counter responsive to pausing the executing of the predefined code segment. At least a second action associated with pausing executing the executing of the predefined code segment is performed. Further, the method includes resuming the executing of the predefined code segment, and resuming the performance counter responsive to resuming the executing of the predefined code segment and at least a third action associated with resuming executing the predefined code segment is performed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments of the invention provide for monitoring a critical section of one or more instrumented applications by the use of a performance counter library (PCL). The PCL is a software library of functions, routines, etc. written in high-level language (e.g., C), in order to access software performance counters to be used for measuring performance of one or more threads of an application being instrumented. More than one application under instrumentation may access the performance counter library at the same time to fine-tune its performance. Each new instrumented thread registers with the performance counter library after the instance of the new instrumented thread is executed. This registration causes the firmware to allocate resources for thread execution.

As instrumented threads start execution and enter "interesting" code (a section of code to monitor), performance counters within the performance counter library save initial information, such as a time stamp, instruction counts, cache information from hardware registers or sampling performance counters in a control block. In embodiments, any interrupts that may interfere in the execution of the instrumented threads are disabled. As the instrumented thread switches to another thread, the performance counter library is notified, counters are paused, and intermediate counter data is recorded. When the instrumented code switches back to the section of code being monitored (i.e., the interesting code), the hooks notify the performance counter and counters are resumed until a final stop of the counter. In embodiments, the performance counters perform actions globally such as, for example, invalidating or flushing cache, priming cache, waiting for all outstanding memory operations, disabling interrupts, changing power management settings, and/or adjusting central processing unit (CPU) clocks.

Figure 1:
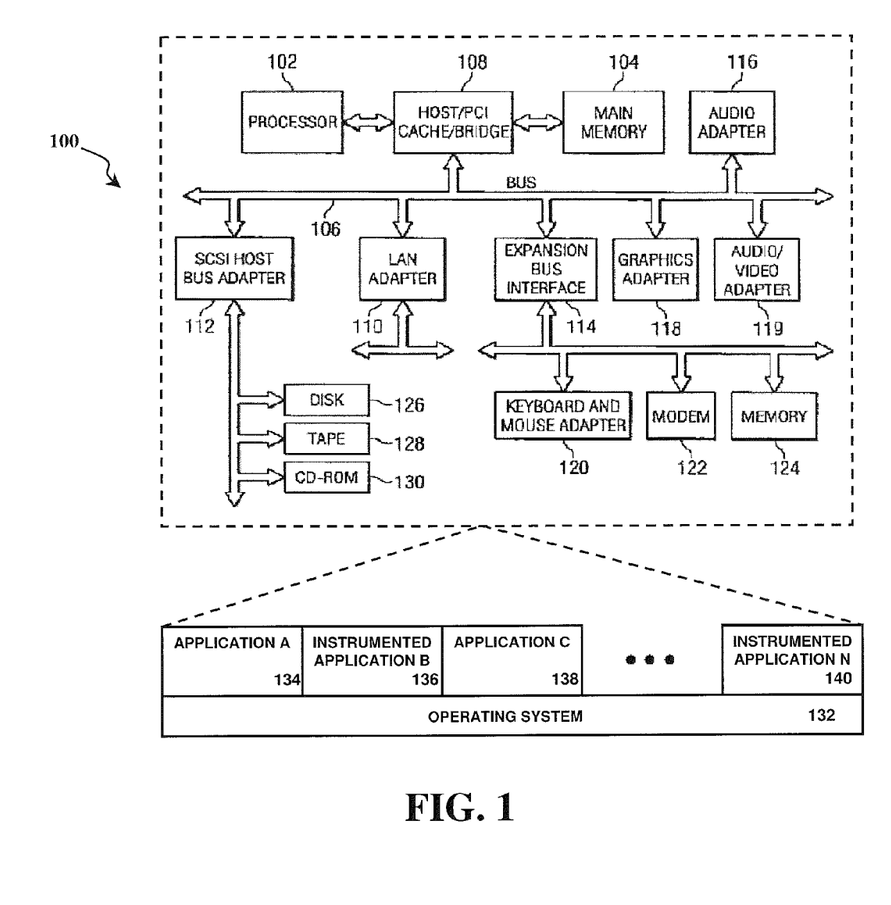
FIG. 1 depicts a system in accordance with an embodiment.

Turning now to the drawings, shown in FIG. 1 is a block diagram of a computer system 100 upon which an instrumented application utilizing a performance counter library is implemented in exemplary embodiments. The system 100 is an example of a computer, in which code or instructions implementing the processes of the present invention may be located. System 100 employs a peripheral component interconnect (PCI) local bus architecture. Although the depicted example employs a PCI bus, other bus architectures such as accelerated graphics port (AGP) and industry standard architecture (ISA) may be used. Processor 102 and main memory 104 are connected to PCI local bus 106 through host 108. Host 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. Additionally, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Additional support for PCI expansion slots or add-in connectors is also supported.

An operating system 132 runs on processor 102 and is used to coordinate and provide control of various components within system 100 in FIG. 1. In an embodiment, the operating system 132 is a commercially available enterprise operating system such as z/Os, which is available from International Business Machines Corporation. A plurality of object oriented programming applications, such as C or C++, may run in conjunction with the operating system 132 and provides calls to the operating system 132 from these applications executing on client 100. In one non-limiting example, system 100 includes non-instrumented application 134, 138 as well as instrumented applications 136, 140 whose analysis and management through a performance counter library is being instrumented. Additionally, the performance counter library comprising of functions, routines, etc. may as well as the applications or programs 134-140 are stored on storage devices, such as hard disk drive 126, and may be loaded into main memory 104 for execution by processor 102.

Other internal hardware or peripheral devices, such as flash read-only memory (ROM), equivalent nonvolatile memory, or optical disk drives and the like, may be used in addition to or in place of the hardware depicted in FIG. 1. Also, the processes of the invention may be applied to a multiprocessor data processing system. For example, system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, system 100 may be a stand-alone system configured to be bootable without relying on some type of network communication interface, whether or not client 100 comprises some type of network communication interface. As a further example, system 100 may be a personal digital assistant (PDA), which is configured with ROM and/or flash ROM to provide non-volatile memory for storing operating system files and/or user-generated data. The depicted example in FIG. 1 and above-described examples are not meant to imply architectural limitations. The processes of the invention are performed by processor 102 using computer implemented instructions, which may be located in a memory such as, for example, main memory 104, memory 124, or in one or more peripheral devices 126-130.

Exemplary embodiments of the invention include one or more instrumented applications that call upon function and/or routines in the performance counter library (PCL). The PCL is a software library of functions, routines, etc. written in high-level language such as, for example, C, in order to access software performance counters to be used within the particular instrumented application. An application is "instrumented" by linking to the performance counter library by inserting a hook. These performance counter library hooks that are inserted into the code are macros, which must be compiled and linked to the performance counter library. More than one application under instrumentation may access the performance counter library at the same time to fine-tune its performance.

In accordance with an exemplary embodiment, an instrumented thread registers with the PCL. Upon registration, it enters an infinite loop, which sends data, and then polls for completions. Both parts of the loop are instrumented. Sending data is monitored with one counter and polling for completions is monitored with another counter.

In accordance with an exemplary embodiment, a thread anchor control block contains private fields used only by the PCL, a list of actions to perform for the thread, and performance counter data. In one exemplary embodiment, performance counter data includes information related to the following: time stamp, instruction counts, and cache information from hardware registers. In one exemplary embodiment, the private fields include a thread identifier, and a linked-list organizing any counters that are not stopped. The actions are performed as the thread is registered with the PCL. They are saved in the thread anchor control block to provide further information when a user is reviewing the performance counter data. The performance counter data is only for the current thread. There may be any number of performance counters utilized for the thread anchor control block. In the exemplary embodiment above, seven different performance counters are utilized.

Thread anchors are also arranged into an array. Each thread that registers with the performance library gets a slot in the array. In an embodiment, a thread anchor control block is for a simple statically sized array (e.g., expressed as: perfmon_thr_anch_t_thr_anchors[PERFMON_THREAD_CNT]).

Figure 2:
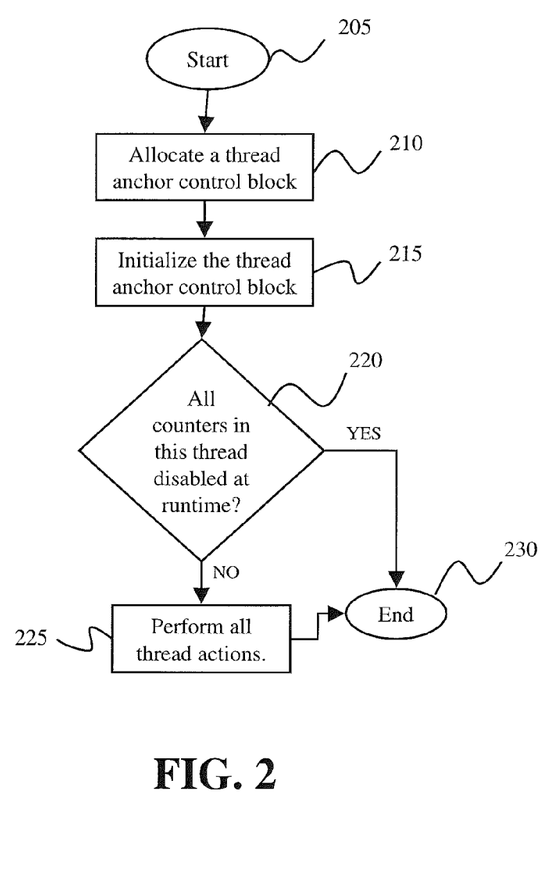
FIG. 2 depicts a process flow for registering a thread with a performance counter library in accordance with an embodiment.

FIG. 2 depicts a method for registering a thread with the performance counter library in accordance with exemplary embodiments. In one example, the method begins at 205. A thread anchor control block is allocated to the instrumented thread at 210. Each thread anchor control block (or thread anchor) is a C preprocessor such as, for example, code for a C macro. The performance counter library hooks are inserted into one or more threads in the application. In some exemplary embodiments, the macros may be function calls or binary patching of the executable to execute the performance counter library code first. The thread anchor includes a linked list of active counters, a thread id, and an array of counters. Thread identifier for each thread, via a thread ids field, is tracked as the thread switches into and out of interesting code.

The performance counters have a control block that has the necessary storage to keep track of the total number times that the counter has been started/stopped, the aggregated info, and manage the counter. Presented below are exemplary embodiments that show a counter for time and instructions executed.

An exemplary control block for a counter for keeping track of time and instructions executed by the counter includes keeping track of the averages, minimums, and maximums for time-base ticks and number of instructions executed. In some exemplary embodiments, a field contains the number of times the counter has been started and stopped. Other fields keep track of time and instructions. In addition, the aggregate amount of time spent in this section of code is tracked as well as the longest time that it took to execute this section of code and the shortest time that it took to execute this section of code. In addition, averages may be calculated.

An exemplary C structure that adds supplementary fields to a counter for managing time and instructions executed includes inuse and paused fields, which are flags that are only used by the PCL. The inuse field is set when the counter has been started. It is reset when the counter is stopped. The "paused" field is set when the counter is paused and reset when the thread is resumed. In an exemplary embodiment, start_actions are performed when the counter is started. Some fields are used to save the initial samples when the counter is started, and others are used to save the accumulated time/instructions less any pause, resume periods.

In an embodiment, as a counter is started, it is added to a doubly-linked list for the particular thread anchor, and an inuse flag is set to indicate that the counter is active. The ticks_start and instr_start fields contain a snap shot of the registers for time and instructions executed at the instant that the counter was started. The ticks_so_far and instr_so_far fields accumulate partial information when a thread switch occurs. When the counter is started, these fields are zeroed. When a thread switch occurs, these fields are incremented by the difference between the current register value and the corresponding start field. When a counter is stopped, the values are incremented appropriately.

Referring back to FIG. 2, the thread anchor control block is initialized and allocated storage at 215. Other actions include: initializing the linked list to be empty, zeroing the counters, and initializing any counters that contain low water marks to a max value. At 220, the CPU determines if all counters for an instrumented thread are disabled at runtime, and skips the actions to perform for the instrumented thread if all counters are disabled and ends the initialization of the thread anchor control block at 230. However, if the counters are not disabled, then any actions associated with the thread are performed at 225. In some non-exemplary embodiments, the performance counter library performs all start actions related to making the performance counters more precise. Some non-limiting embodiments of actions include adjusting operating system setting, invalidate or flush cache, prime cache, wait for all outstanding memory operations, disable interrupts that may interfere with thread execution, change power management settings, and adjust CPU clocks. The process of registering the thread ends at 230.

Figure 3:
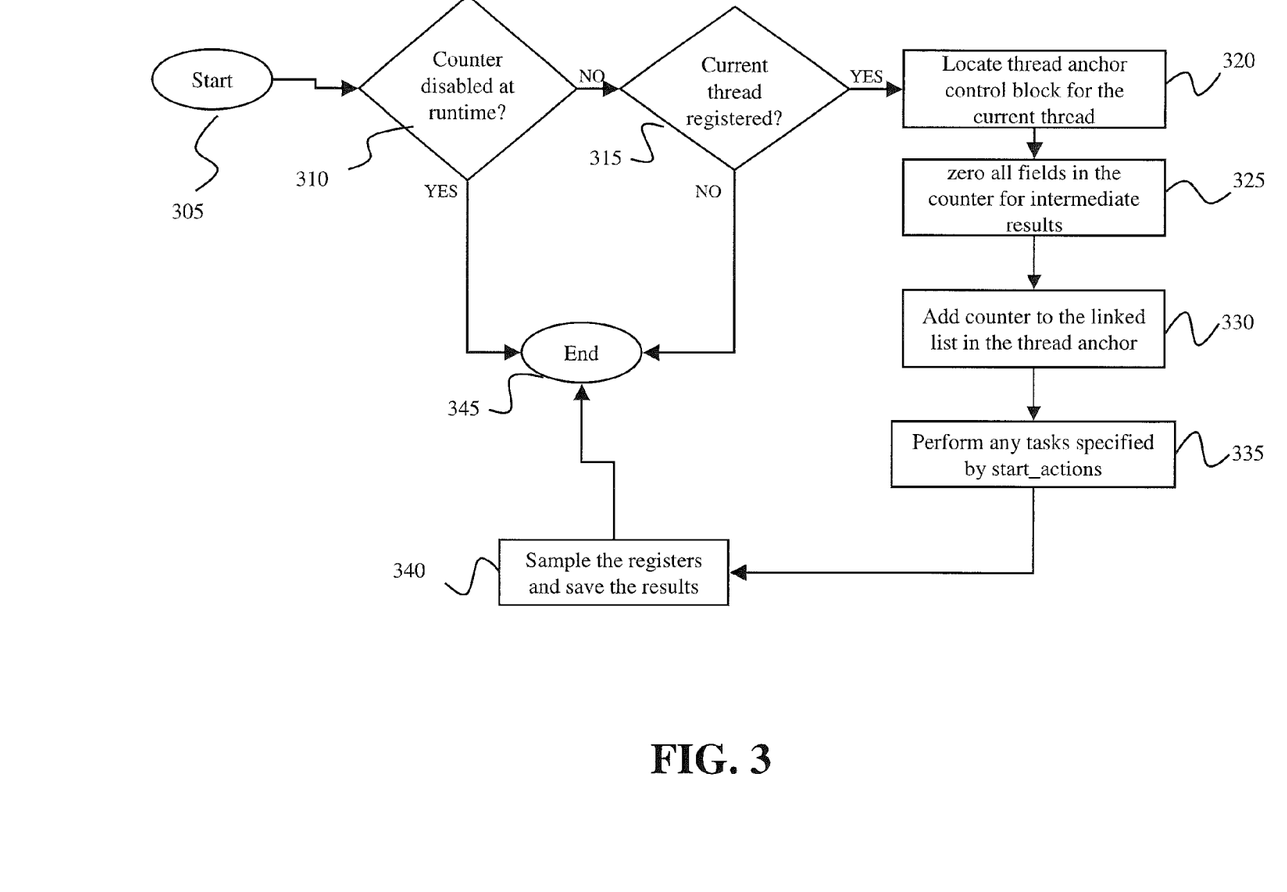
FIG. 3 depicts a process flow for starting a counter in accordance with an embodiment.

FIG. 3 depicts a method for starting a counter in accordance with exemplary embodiments. In one example, the method starts at 305. At 310, if all counters in the thread are disabled at runtime, then thread actions for the instrumented thread be skipped and the process ends at 345. However, if the counters are not disabled, then at 315, the current thread is registered with the performance counter library. Here, the thread anchor control block is identified for the current thread. However, if the current thread is not registered, the process ends at 345. At 320, the counters are started and as the thread enters interesting code, counter information is collected for all events. Certain timing information is collected as the instrumented thread enters these statements or lines of code within the interesting code. At 325, fields for intermediate counter data are zeroed to prepare for any thread switches that may occur. The counter is added to a linked list in the thread anchor at 330 in order to keep track of the counters that need to be managed during a thread switch. At 335, the performance counter library performs all actions associated with the start_actions field in order to prepare the system for collecting data. At 340, the hardware registers are sampled and the results are saved in the start fields for the counter. However, in another exemplary embodiment, a software counter residing in memory may also perform the function of a hardware register. The process of starting a counter ends at 345.

Presented below in Table 1 are some exemplary actions for any actions associated with the performance counters.

TABLE 1

Common preparation work to be done as a counter is started, paused, resumed, and/or stopped

| Action | Purpose |
|---|---|
| Invalidate or flush cache | A counter might track how many cache lines a piece of code touches, or accurately measure latency to some level in the memory hierarchy. |
| Prime cache | Allows the performance library to touch any interesting memory that the instrumented code will access. This avoids cache misses, and help get more precise timing information. |
| Wait for all outstanding memory operations | Allows a counter to collect information about ideal memory conditions. |
| Disable interrupts | Accuracy of a counter may be improved by disabling interrupts and preventing thread switching. Any thread switching is explicit with a sched_yield( ). |
| Change power management settings | Disabling power management might yield more accurate timing information, or allow some polling code to complete in fewer instructions. |
| Adjust CPU clocks | Speeding up a CPU clock eliminates error when timing very short code paths. Slowing down a CPU clock avoids wrapping issues for long code paths. |

Figure 4:
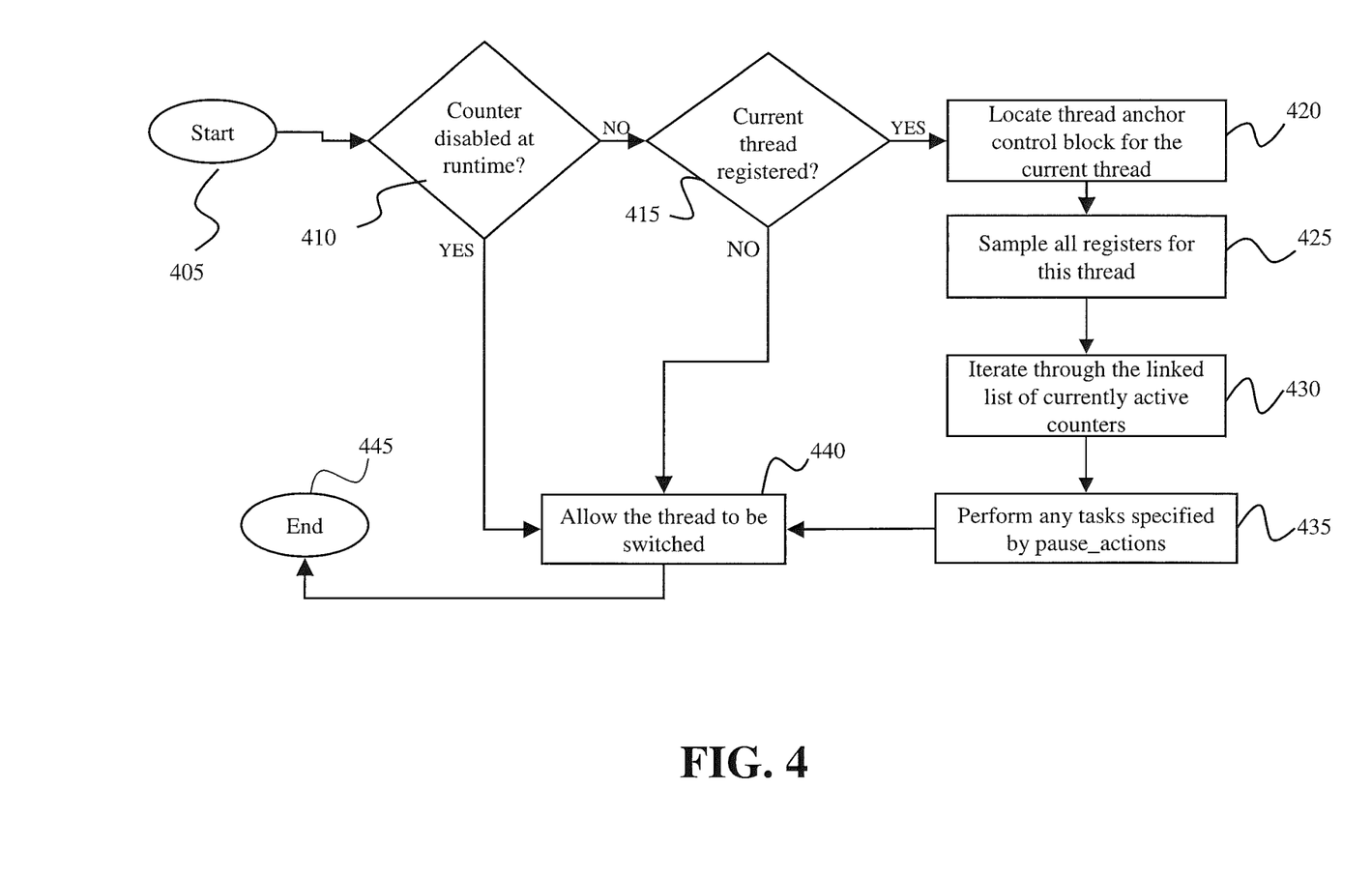
FIG. 4 depicts a process flow for an instrumented thread that thread switches and pauses a performance counter in accordance with an embodiment.

FIG. 4 depicts a method for pausing a running counter prior to a thread switch and relinquishing the processor in accordance with exemplary embodiments. In one example, the method begins at 405. At 410, if a running counter in the thread is disabled, then the thread is allowed to be switched at 440. However, if the running counter is not disabled, then at 415, if the current thread is registered with the performance counter library, the thread anchor control block including its thread_id is identified for the current thread at 420. However, if the current thread is not registered, then allow the thread to be switched at 440. At 425, the hardware registers associated with the counters are sampled and the results are saved in the start fields in the counter. In another exemplary embodiment, a software counter residing in memory may also perform the function of a hardware register. Next, iterate through the linked list of currently active counters and calculate intermediate results and store them into an intermediate results field inside the counters at 430. At 435, the performance counter library performs all actions associated with the pause_actions field such as, in one exemplary embodiment, restore any interrupts that were disabled. Additionally, current information for all events is collected. Also, an accounting occurs where intermediate_results are collected and saved in a performance counter control block. Once all the tasks in the pause_actions field of the counter are completed, the thread is allowed to be switched via a hook at 440. The process of pausing a counter ends at 445.

Figure 5:
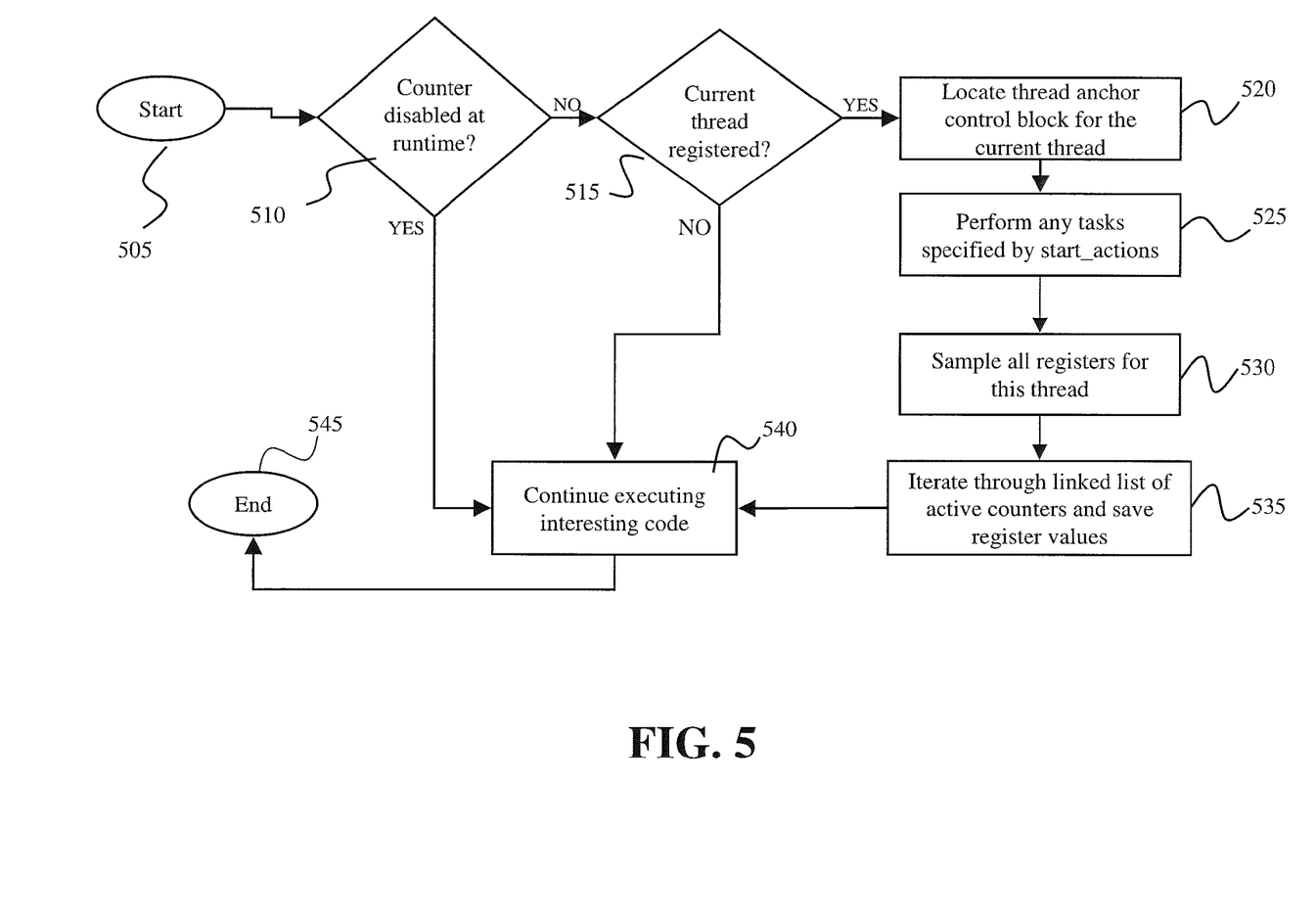
FIG. 5 depicts a process flow of a thread switch that resumes a performance counter in accordance with an embodiment.

FIG. 5 depicts a method for resuming a paused counter after a thread switch and acquiring the processor in accordance with exemplary embodiments. In one example, the method begins at 505. At 510, if counters are disabled at runtime, then continue executing interesting code at 540. However, if counters are not disabled, then at 515, the thread anchor control block is identified for the current thread at 520. However, if the current thread is not registered, then continue executing interesting code at 540. At 525, the performance counter library performs all actions associated with the start_actions field (shown in Table 1) in order to resume the counters for collecting data. At 530, the hardware registers associated with the active thread are sampled, the linked list of currently active counters are iterated, and register values are saved in the start field inside the counter at 535. Current information for all events is collected and an accounting occurs where results are collected and saved in the thread anchor control block. At 540, the processor continues executing interesting code. The process of resuming a counter ends at 545.

Figure 6:
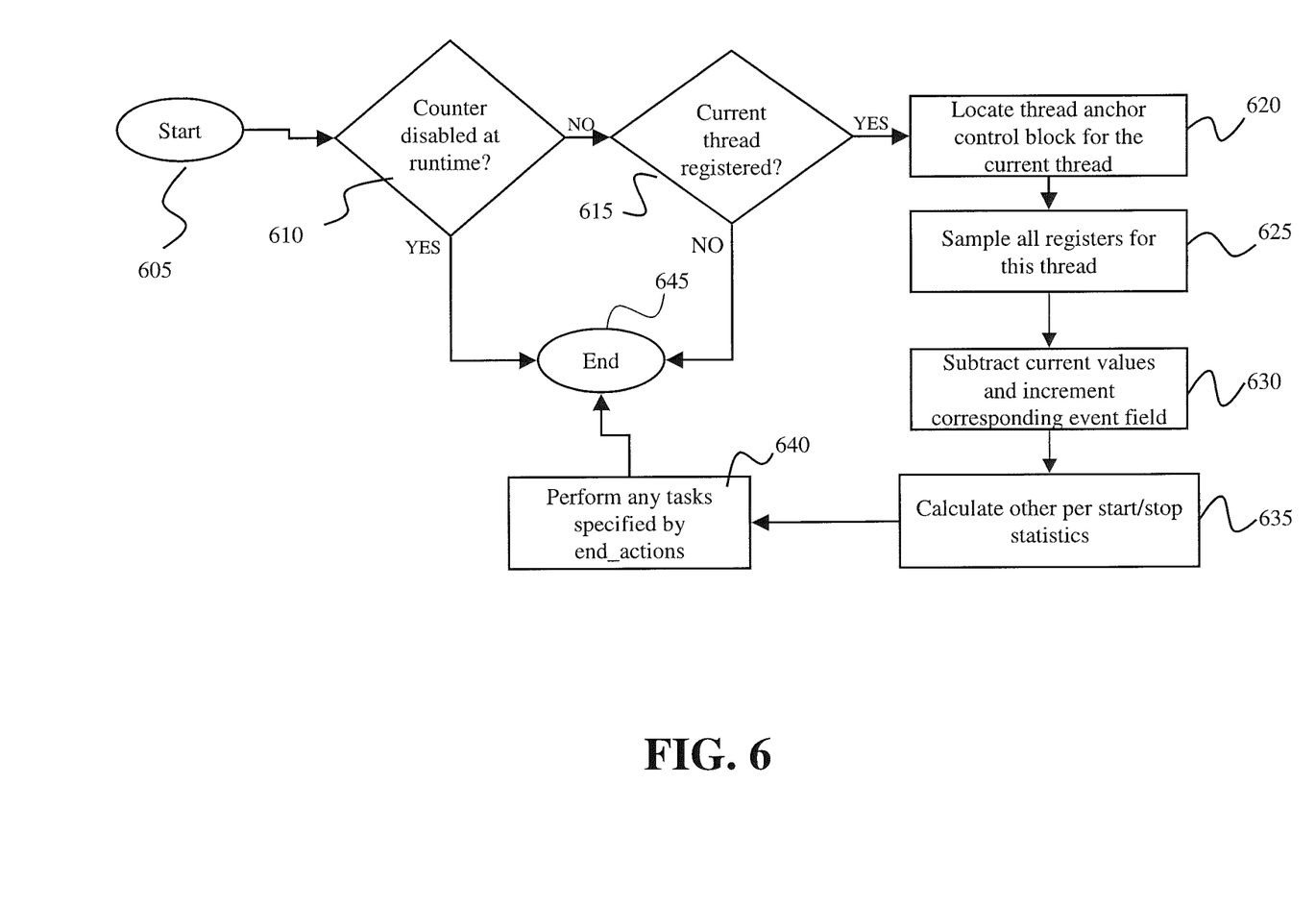
FIG. 6 depicts a process flow for stopping a counter in accordance with an embodiment.

FIG. 6 depicts a method for stopping a running counter in accordance with exemplary embodiments. In one example, the method begins at 605. At 610, if counters are disabled at runtime, then the process of stopping a counter ends at 645. Next, if the counter is not disabled, then at 615, a determination is made as to whether the current thread is registered. If the current thread is registered with the performance counter library, the thread anchor control block is identified for the current thread at 620. However, if the current thread is not registered, the process of stopping a counter ends at 645. At 625, the hardware registers associated with the active thread are sampled. At 630, current information for all monitored events is collected and an accounting is performed to determine the change since the counter was started. Also, any intermediate results saved in the counter during pausing the counter are accounted for. Optionally, other exemplary statistics such as average time, minimum time, maximum time, are calculated at 635. The performance library performs all actions specified by the end_actions at 640. The end_actions field is used to tell the PCL about any work that needs to be done after the counter is stopped. An exemplary embodiment of the end_actions field would be to log the counter to a terminal or a file. Additionally, the end_actions field may instruct the performance library to undo any start_actions shown in Table 1. The process of stopping a counter ends at 645.

Technical effects and benefits include the ability to utilize a performance counter library to determine performance characteristics for an instrumented application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:

executing a predefined code segment of an application, the executing on a processor and including executing an instrumented thread included in the predefined code segment;

performing at least a first action associated with executing the instrumented thread in the predefined code segment, the performing the at least first action responsive to enabling a performance counter and registering the instrumented thread with a performance counter library;

starting the performance counter associated with the predefined code segment, the starting responsive to executing the instrumented thread;

pausing the execution of the predefined code segment;

pausing the performance counter responsive to pausing the executing of the predefined code segment;

performing at least a second action associated with pausing the executing of the predefined code segment, the performing the at least second action responsive to enabling the performance counter and registering the instrumented thread;

resuming the executing of the predefined code segment; resuming the performance counter responsive to resuming the executing of the predefined code segment; and performing at least a third action associated with resuming the executing of the predefined code segment, the performing the at least third action responsive to enabling the performance counter and registering the instrumented thread.

2. The method of claim 1, wherein the registering of the instrumented thread further comprises allocating a control block to the instrumented thread.

3. The method of claim 2, wherein the registering the instrumented thread further comprises allocating the performance counter to the instrumented thread.

4. The method of claim 2, further comprising inserting a declarative statement into the instrumented thread, the declarative statement configured to call at least one performance counter in the performance counter library.

5. The method of claim 1, further comprising:
completing execution of the predefined code segment;
stopping the performance counter responsive to the completing; and
performing at least a fourth action associated with completing the executing of the predefined code segment, the performing the at least fourth action responsive to enabling the performance counter and registering the instrumented thread.

6. The method of claim 1, wherein the pausing of the performance counter comprises storing state data associated with the performance counter.

7. The method of claim 5, wherein at least the first, the second, the third, and the fourth action is selected from the group consisting of invalidating or flushing cache, priming cache, waiting for all outstanding memory operations, disabling at least one interrupt, changing power management setting, and adjusting central processor clocks.

8. A system comprising a processor configured to perform a method comprising:
executing a predefined code segment of an application, the executing on a processor and including executing an instrumented thread included in the predefined code segment;
performing at least a first action associated with executing the instrumented thread in the predefined code segment, the performing the at least first action responsive to enabling a performance counter and registering the instrumented thread with a performance counter library;
starting the performance counter associated with the predefined code segment, the starting responsive to executing the instrumented thread;
pausing the execution of the predefined code segment;
pausing the performance counter responsive to pausing the executing of the predefined code segment;
performing at least a second action associated with pausing the executing of the predefined code segment, the performing the at least second action responsive to enabling the performance counter and registering the instrumented thread;
resuming the executing of the predefined code segment;
resuming the performance counter responsive to resuming the executing of the predefined code segment; and
performing at least a third action associated with resuming the executing of the predefined code segment, the performing the at least third action responsive to enabling the performance counter and registering the instrumented thread.

9. The system of claim 8, wherein the registering of the instrumented thread further comprises allocating a control block to the instrumented thread.

10. The system of claim 9, wherein the registering of the instrumented thread further comprises allocating the performance counter to the instrumented thread.

11. The system of claim 9, wherein the method further comprises inserting a declarative statement into the instrumented thread, the declarative statement configured to call at least one performance counter in the performance counter library.

12. The system of claim 8, wherein the method further comprises: completing the executing of the predefined code segment; stopping the performance counter responsive to the completing; and performing at least a fourth action associated with completing the executing of the predefined code segment, the performing the at least fourth action responsive to enabling the performance counter and registering the instrumented thread.

13. The system of claim 8, wherein the pausing the performance counter comprises storing state data associated with the performance counter.

14. The system of claim 12, wherein at least the first action, the second action, the third action, and the fourth action is selected from the group consisting of invalidating or flushing cache, priming cache, waiting for all outstanding memory operations, disabling at least one interrupt, changing power management setting, and adjusting central processor clocks.

15. A computer program product comprising a non-transitory tangible storage medium readable by a processing circuit and storing instructions for execution by the processing circuit for performing a method comprising:
executing a predefined code segment of an application, the executing on a processor and including executing an instrumented thread included in the predefined code segment;
performing at least a first action associated with executing the instrumented thread in the predefined code segment, the performing the at least first action responsive to enabling a performance counter and registering the instrumented thread with a performance counter library;
starting the performance counter associated with the predefined code segment, the starting responsive to executing the instrumented thread; pausing the execution of the predefined code segment;
pausing the performance counter responsive to pausing the executing of the predefined code segment;
performing at least a second action associated with pausing the executing of the predefined code segment, the performing the at least second action responsive to enabling the performance counter and registering the instrumented thread;
resuming the executing of the predefined code segment; resuming the performance counter responsive to resuming the executing of the predefined code segment; and
performing at least a third action associated with resuming the executing of the predefined code segment, the performing the at least third action responsive to enabling the performance counter and registering the instrumented thread.

16. The computer program product of claim 15, wherein the registering of the instrumented thread further comprises allocating a control block to the instrumented thread.

17. The computer program product of claim 16, wherein the registering of the instrumented thread further comprises allocating the performance counter to the instrumented thread.

18. The computer program product of claim 16, wherein the method further comprises inserting a declarative statement into the instrumented thread, the declarative statement configured to call at least one performance counter in the performance counter library.

19. The computer program product of claim 15, wherein the method further comprises:
completing the executing of the predefined code segment;
stopping the performance counter responsive to the completing; and performing at least a fourth action associated with completing the executing of the predefined code segment, the performing the at least fourth action responsive to enabling the performance counter and registering the instrumented thread.

20. The computer program product of claim 15, wherein the pausing of the performance counter comprises storing state data associated with the performance counter.

21. The computer program product of claim 19, wherein at least the first action, at least the second action, at least the third action, and at least the fourth action is selected from the group consisting of invalidating or flushing cache, priming cache, waiting for all outstanding memory operations, disabling at least one interrupt, changing power management setting, and adjusting central processor clocks.

* * * * *